(12) United States Patent
Surridge

(10) Patent No.: US 6,202,777 B1
(45) Date of Patent: Mar. 20, 2001

(54) ENGINE ENCLOSURE WITH COOLING AIR BAFFLE

(75) Inventor: David Gayland Surridge, Garner, NC (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/316,200

(22) Filed: May 21, 1999

(51) Int. Cl.⁷ ................................................. B60K 11/00
(52) U.S. Cl. .................. 180/68.1; 180/69.2; 296/196
(58) Field of Search .................. 180/68.1, 68.2, 180/68.4, 68.6, 69.21, 69.24, 89.17, 69.2; D15/23; 296/196, 193; 123/41.49, 41.7, 41.48, 41.56; 56/12.8

(56) References Cited

U.S. PATENT DOCUMENTS

| | | | |
|---|---|---|---|
| D. 421,266 | * 2/2000 | Hinklin ................................ D15/23 |
| 1,254,861 | * 1/1918 | Smeeth ............................. 123/41.49 |
| 3,982,600 | 9/1976 | Gerresheim et al. ............. 180/69 C |
| 4,173,995 | 11/1979 | Beck ..................................... 165/51 |
| 4,339,014 | * 7/1982 | Berth et al. ......................... 180/68.1 |
| 4,341,277 | 7/1982 | Adamson et al. ...................... 180/54 |
| 4,432,309 | * 2/1984 | Hutchinson et al. ........... 123/41.7 X |
| 4,589,379 | * 5/1986 | Fujikawa et al. ................. 123/41.49 |
| 4,815,550 | 3/1989 | Mather et al. ....................... 180/68.1 |
| 4,940,100 | * 7/1990 | Ueda .................................. 180/68.1 |
| 5,193,636 | * 3/1993 | Holm ................................. 180/68.1 |
| 5,678,648 | * 10/1997 | Imanishi et al. .................... 180/68.1 |
| 5,689,953 | * 11/1997 | Yamashita et al. ............ 123/41.7 X |
| 5,947,219 | * 9/1999 | Peter et al. .......................... 180/68.1 |
| 6,082,477 | * 7/2000 | Murakawa ........................ 180/69.21 |

FOREIGN PATENT DOCUMENTS

2146218 * 6/1990 (JP).
6058146 * 3/1994 (JP).
1089068 * 4/1998 (JP).

OTHER PUBLICATIONS

Toro, Reelmaster 4500–D 2 or 4 Wheel Drive, pp. 1–6, date of publication—1993, published in U.S.A.

Toro, Reelmaster 335–D, pp. 1–4, date of publication—1990, published in U.S.A.

Ransomes Inc., Ransomes Bob–Cat Tractors, cover plus color pp. 1, 5, 7, & 8, date of publication—1987, published in U.S.A.

Jacobsen Textron, LF–3810, pp. 1–8, date of publication—1995, published in U.S.A.

Deere & Company, 2243 Professional Greens Mower, pp. 1–4, date of publication Jan. 1992, published in U.S.A.

Jacobsen Textron, LF–128 & LF–135 Turbo, pp. 1–6, date of publication 1997, published in U.S.A.

\* cited by examiner

*Primary Examiner*—Brian L. Johnson
*Assistant Examiner*—Bryan Fischmann

(57) ABSTRACT

A cooling system assembly is provided for an off-road vehicle having an engine surrounded at least in part by an engine enclosure. The cooling system assembly includes a heat exchanger having an air intake face. The heat exchanger is coupled to the engine for cooling the engine. The engine enclosure includes an end face lying substantially in a plane disposed substantially perpendicular to a longitudinal axis of the vehicle and first and second side faces, each of said first and second side faces lying substantially in a plane disposed substantially parallel to the longitudinal axis of the vehicle. The enclosure has an air intake located at least partially on the end face and at least one of the first and second side faces. An inner wall forms a baffle on at least one of the faces for directing air from the air intake to the heat exchanger air intake face.

10 Claims, 7 Drawing Sheets

ENGINE ENCLOSURE WITH COOLING AIR BAFFLE

BACKGROUND OF THE INVENTION

1. Field of the Invention

The present invention relates to cooling systems for motor vehicles. In particular, the present invention relates to a vehicle hood for enclosing an engine and related cooling system. The hood includes a screened cooling air intake and an air baffle for directing ambient cooling air to a radiator. Sealing surfaces of the hood prevent engine-heated air from being used to cool the radiator and help isolate engine noise.

2. Description of Related Art

Conventional hoods or shrouds on small vehicles such as front mounted mowers typically enclose an engine, cooling system, and other vehicle components. Such vehicles commonly utilize liquid cooled internal combustion engines which generate heat during their operation. Liquid-cooled engines employ pressurized coolant circulated through the engine to absorb heat. The heated coolant is subsequently passed through a heat exchanger such as a radiator to dissipate heat from the coolant to the atmosphere, after which the coolant is recirculated to the engine for further cooling. As the coolant is passed through the heat exchanger, air flows through the heat exchanger to absorb heat and carry it out into the atmosphere. Air is commonly drawn or propelled through the radiator by use of a fan.

The capacity of a cooling system in such a vehicle depends on many factors including the velocity and volume of air flowing through the heat exchanger, as well as the distribution of the air flow over the available heat exchange surface of the radiator. Since these vehicles are often used in cutting grass and other vegetation, the air used to cool the radiator is frequently contaminated with dust, grass clippings and similar debris. Typically, such vehicles will include a grille or grilles on their hoods to reduce debris present in the cooling air while allowing the air to pass into the area enclosed by the hood to cool the engine by interaction with the radiator. However, a further problem can occur when the cooling air is drawn in around the engine. This air can become heated by the engine and cooling of the radiator can become more difficult. When ducting structures are used to keep the air cool by guiding it around the engine and to the radiator, they can interfere with access to engine components for service and/or maintenance.

It would therefore be desirable to provide an engine enclosure for a liquid cooled engine which can provide a sufficient supply of air to cool the radiator and engine coolant circulating through it. It would also be desirable to provide the supply of air without the flow being interrupted or compromised due to blockages caused by dust, grass clippings or similar debris. It would further be desirable to prevent the air supply from being heated by the engine as it is drawn to and passed through the radiator. Also, it would be desirable that the air heated by passing through the radiator be exhausted in a manner that would not affect the operator or lawn being cut. It would be desirable as well to provide an air intake structure that would not interfere with servicing and/or maintenance of the engine and its components. Lastly, it would be desirable to provide an air intake structure that would serve to minimize the engine noise escaping from the engine compartment.

It would also be desirable to provide a single piece hood that encloses the top and sides of the component compartment area, and which is provided with baffles defining air passages to allow for cooling air and carburetion air to pass therethrough. It would further be desirable to provide a hood capable of being made of a composite material so as to simplify the manufacturing, assembly, maintenance and styling needs associated with the hood.

SUMMARY OF THE INVENTION

Toward these ends, there is provided an engine enclosure formed as a vehicle hood that encloses the top, sides and rear portions of the vehicle engine component compartment area. The hood is movable to permit access to the components carried in the area enclosed by its top and side surfaces. A screened air inlet (grille) is provided in the side and rear portions of the shroud to allow for increased entry of cooling and carburetion air, while baffles and sealing surfaces direct the air to the radiator. A small portion of the air is directed to an air filter for engine combustion.

The hood comprises the grille and an aligned baffle which provides an air passage therebetween so that air is directed toward the radiator. The grille is sized larger than an intake face of the radiator and is present on more than one surface of the hood to provide a high volume of cooling air at a low flow rate that will minimize the buildup of dust, grass clippings and similar debris on the grille. Preferably, the grille is located substantially above the ground to reduce its exposure to dust and debris and is positioned in a generally vertical orientation to minimize the entry of rain, leaves and/or related debris.

The air passages between the grille surfaces of the hood and baffle structure isolate the air from being warmed by the engine as it is directed to the radiator. Air warmed after passing through the radiator is then exhausted from the engine enclosure, away from the operator.

Preferably, the hood is formed as a unitary composite member with baffles formed integrally therewith. The reduction in the number of parts represents a cost savings and simplifies the vehicle assembly process. Also, the number of joints which require sealing in order to convey the cooling air are reduced.

DESCRIPTION OF THE PREFERRED EMBODIMENT

Figure 1:
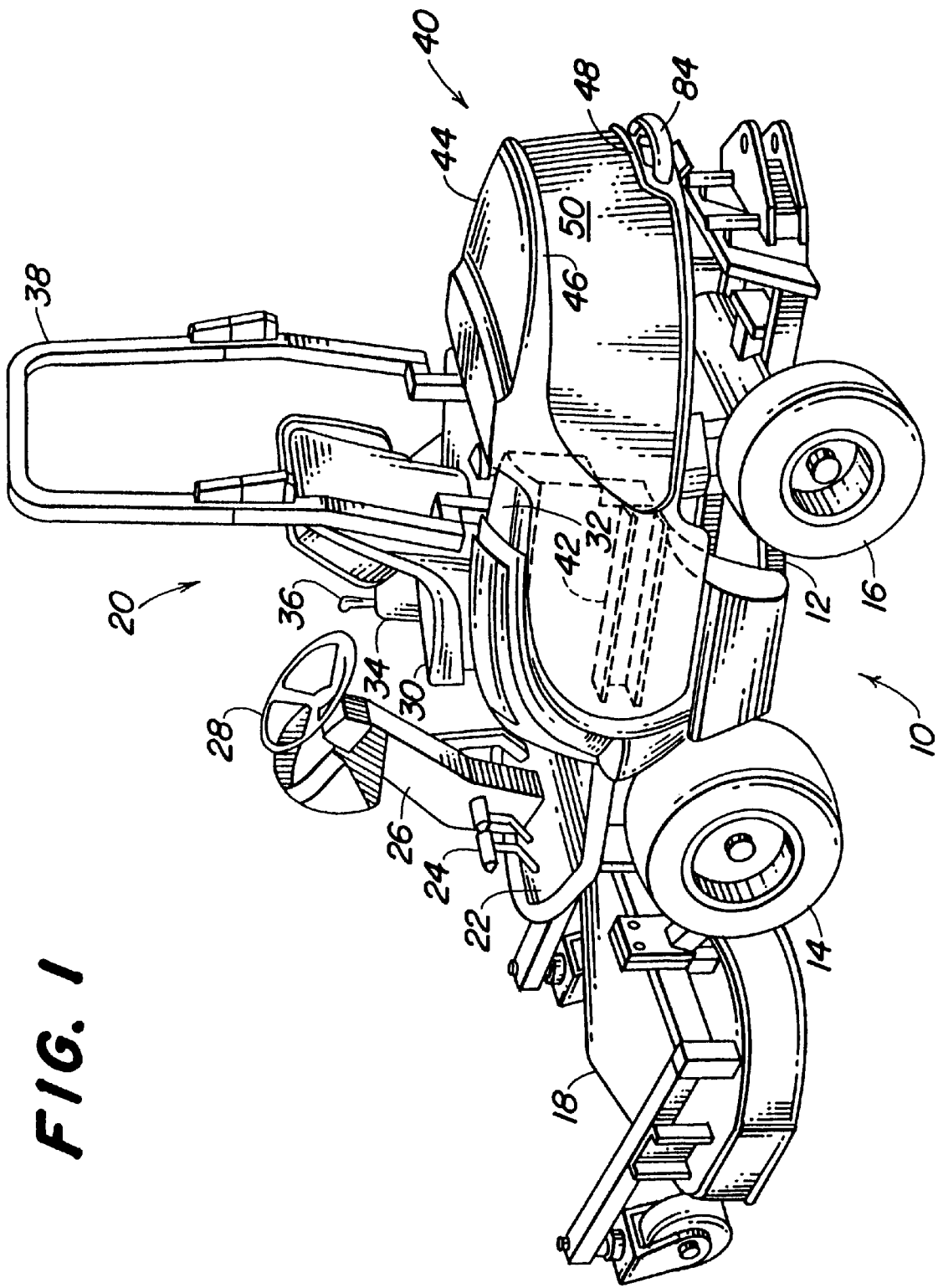
FIG. 1 is a rear elevated perspective view of a front mount mower upon which the shroud of the present invention can be utilized.

A front mount mower vehicle 10 upon which the present invention may be utilized is shown generally in FIG. 1. The vehicle 10 includes a frame 12 supported on front drive wheels 14 and rear steerable wheels 16. At the front of the vehicle 10 is carried a mower deck implement 18. The frame 12 supports an operator station 20 at its forward end, having a foot platform 22 with foot controls 24 projecting upwardly therethrough, an upstanding steering column 26 which carries a steering wheel 28, and an operator seat 30. At the left side of the operator seat 30 is a fuel tank 32, while at the right side of the operator station 20 is a console 34 with hand controls 36. Rearwardly of the operator seat 30 is a foldable rollover protection device 38. Enclosing the rear and side portions of the vehicle 10 is a shroud or hood structure 40 that is mounted on the fuel tank 32 and control console 34 for fore and aft sliding movement. Shifting of the hood 40 between a forward, closed position and rearward, open position is accomplished through the provision of a sliding track mechanism 42. The hood 40 includes a top or upper surface 44, side surfaces 46 and a rear surface area 48. In the rear portion of the hood 40 is a screened area or grille 50 that encompasses portions of the side surfaces 46 and the rear surface 48, allowing cooling and carburetion air to pass therethrough.

Figure 2:
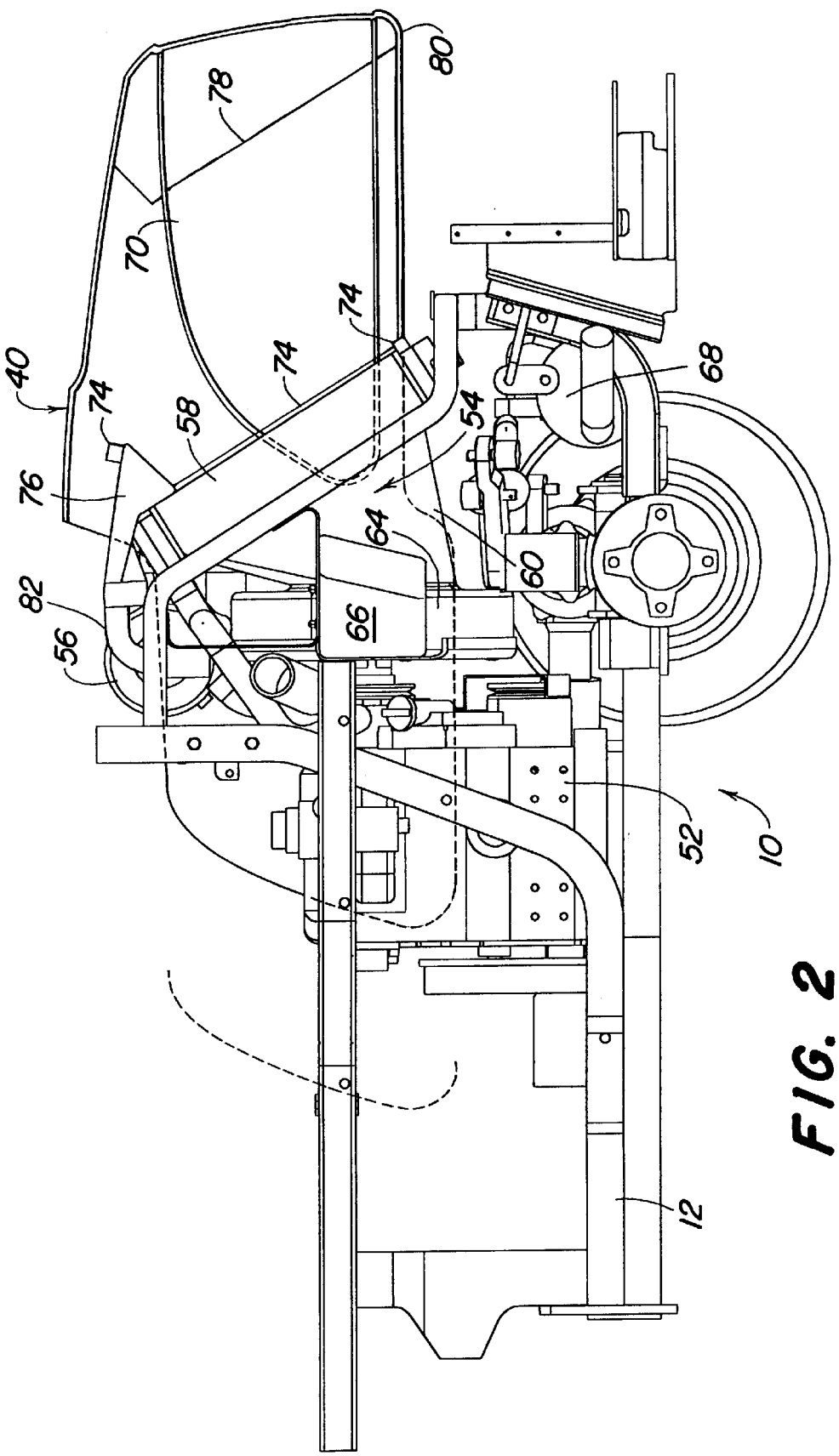
FIG. 2 is a left side partial elevational view of the vehicle illustrating some of the components enclosed by the hood, which is slid rearward toward its open position.
Figure 6:
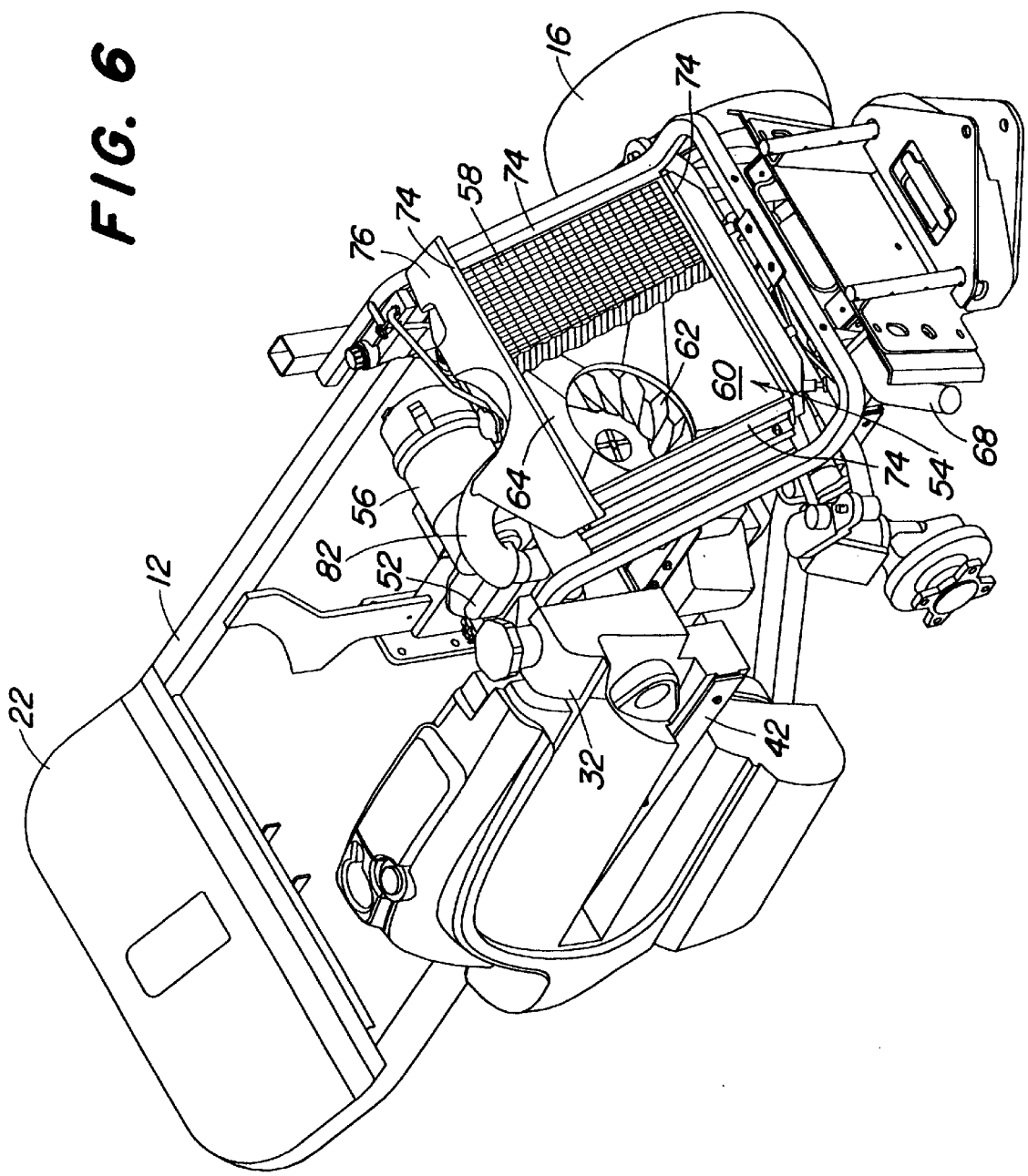
FIG. 6 is a left rear elevated fragmentary perspective view of the vehicle illustrating various components of the vehicle cooling system.
Figure 7:
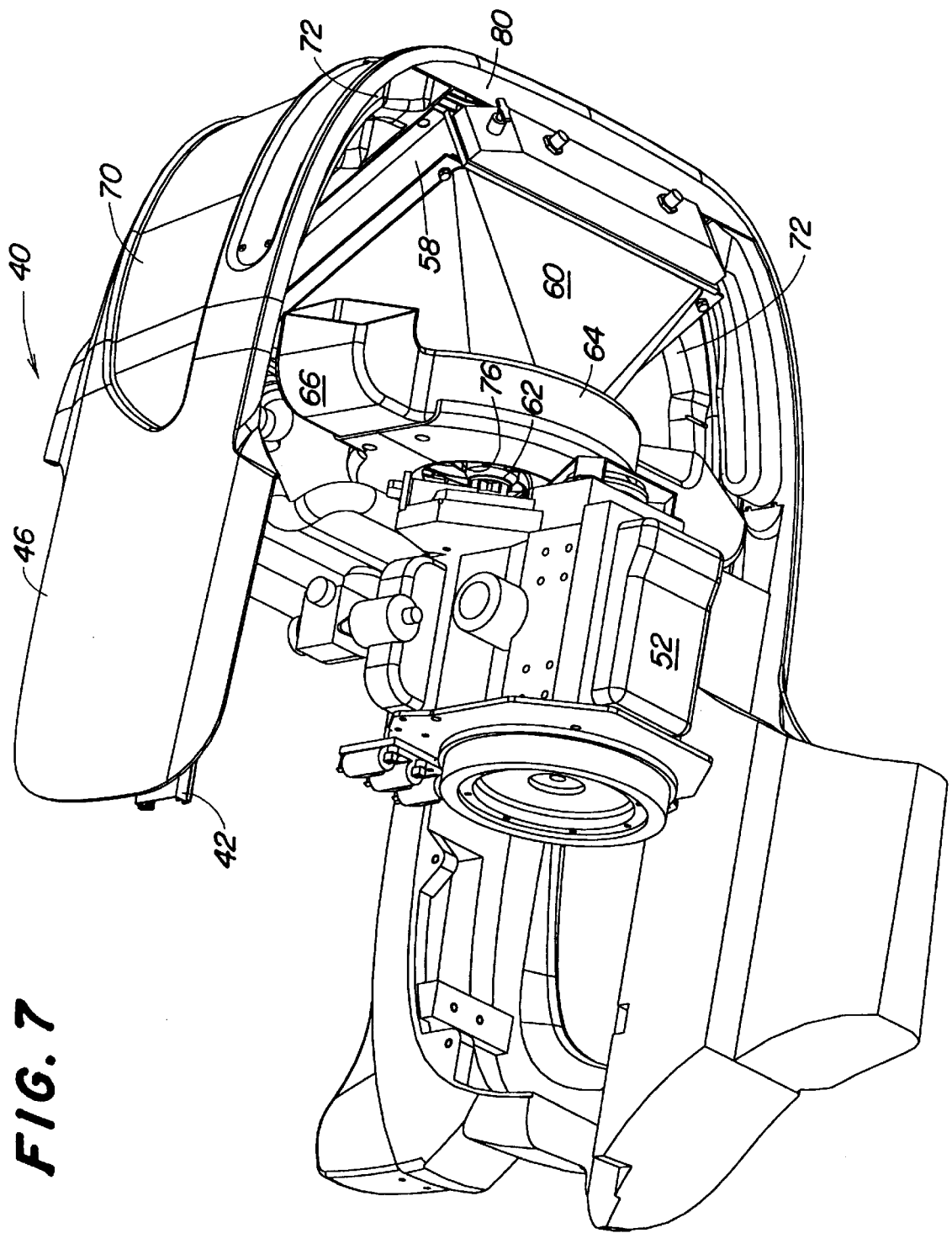
FIG. 7 is a partial lower elevational view illustrating the engine, hood, radial fan and the ductwork.

Looking to FIG. 2, there is illustrated a left side partial elevational view of the vehicle 10 and components carried under and behind the hood 40, which is shown in phantom. This view illustrates the compartment area enclosed by the hood 40 within which are carried an engine 52, a cooling system 54 and assorted other vehicle components, such as control linkages. The engine 52 is mounted in the midportion of the vehicle 10 just ahead of the rear wheels 16. An air filter 56 is carried above the engine 52 for providing carburetion air to the engine 52. The cooling system 54 includes a radiator 58 which is mounted to the periphery of a fan air intake duct 60. The duct 60 carries air to a radial fan 62 (shown in FIGS. 6 & 7) which is housed within a fan shroud 64 between the engine 52 and radiator 58. The radial fan 62 draws air from a front portion of the compartment enclosed by the hood 40 to cool the engine and exhaust air heated by the engine 52, as well as air from a rear direction which passes through the radiator 58. Air drawn by the fan 62 is exhausted to the rear of the implement and through the fan shroud 64 at left and right discharge ducts 66, the left duct 66 being shown in FIGS. 2 & 7. The discharge ducts 66 may also include a downwardly and rearwardly directed extension, which are not shown in the Figures to divert air more directly over a muffler 68, see FIG. 2, carried at the rear of the vehicle 10 to cool it and retard the accumulation of grass clippings and miscellaneous debris adjacent the muffler 68.

Figure 3:
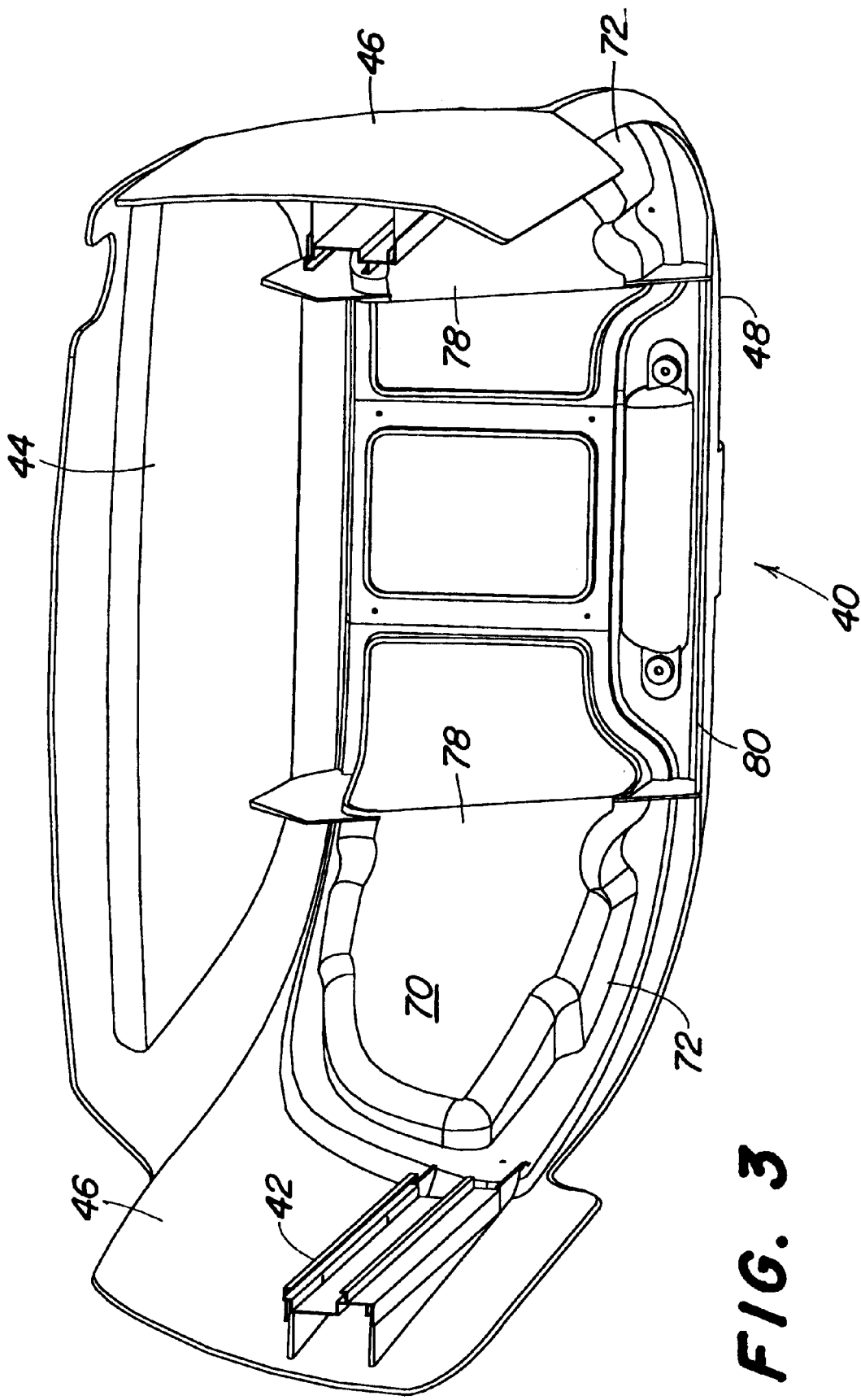
FIG. 3 is left front perspective view of the inside of the hood.
Figure 4:
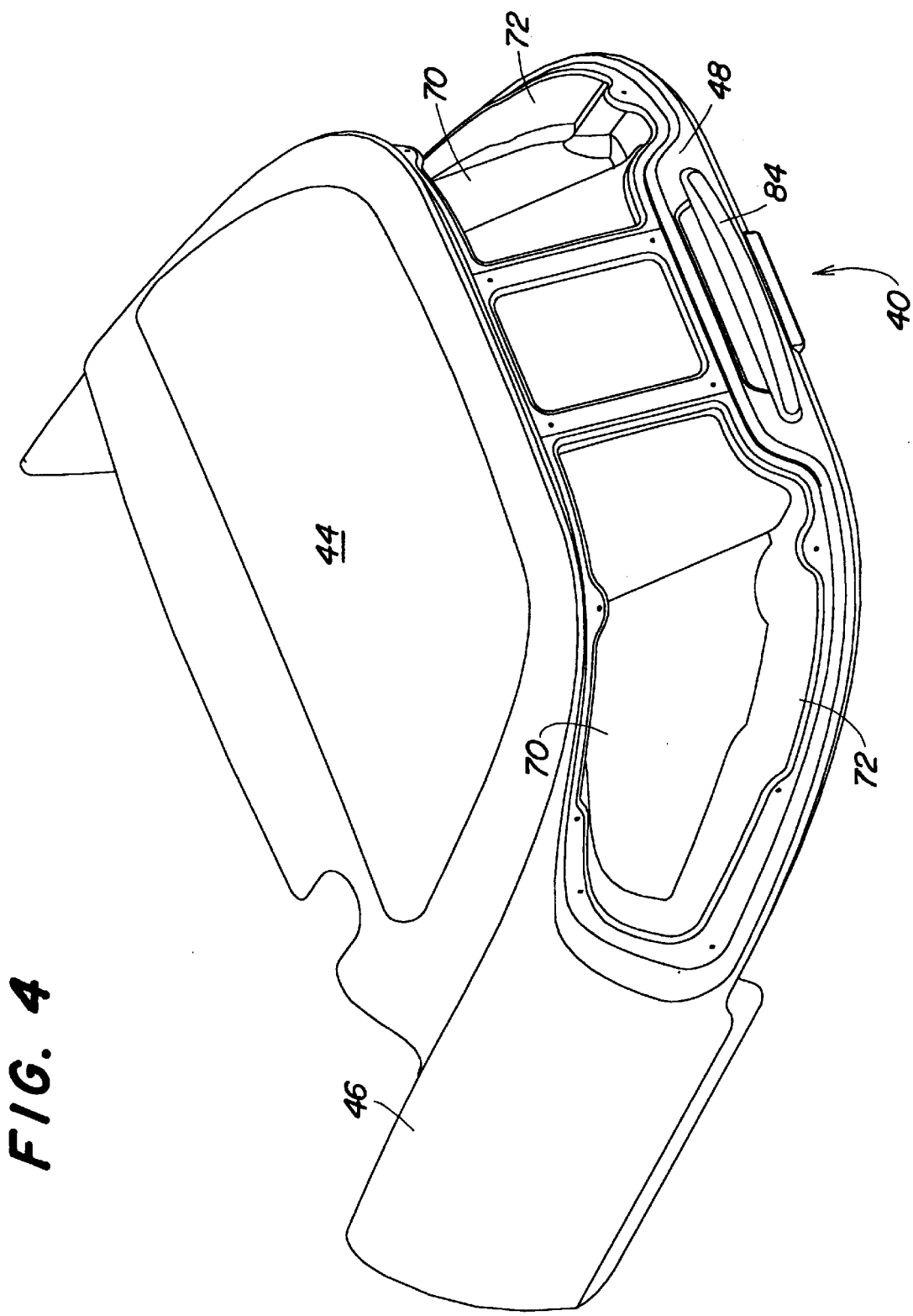
FIG. 4 is a left rear elevated perspective view of the hood wherein the grilles have been removed to reveal the integrally molded baffles.

Referring now to FIGS. 2, 3 and 4, which show the hood 40 from various perspectives, the hood 40 includes recessed baffles 70 on both side surfaces 46 of the hood 42. The baffles 70 are in alignment with the screens which form the grille 50 and include sidewalls 72 which isolate the cooling air flow from the interior of the compartment defined by the hood 40. Gaskets 74 are provided about the periphery of the radiator 58 so that the hood, when closed as during normal operation of the vehicle, seals against an intake face of the radiator 58. The gasket 74 at the top of the radiator 58 is secured to a wedge-shaped barrier provision 76 mounted to the top portion of the radiator 58. The gaskets 74 at the sides of the radiator 58 seat against sealing surfaces provided by rearward edges 78 of the baffle 70, and the bottom gasket 74 seats against an inward extending bottom edge 80 of the rear surface 48 of the hood 40. Meanwhile, the top gasket 74 on the barrier provision 76 will seat against the interior of the upper surface 44 of the hood 40.

Figure 5:
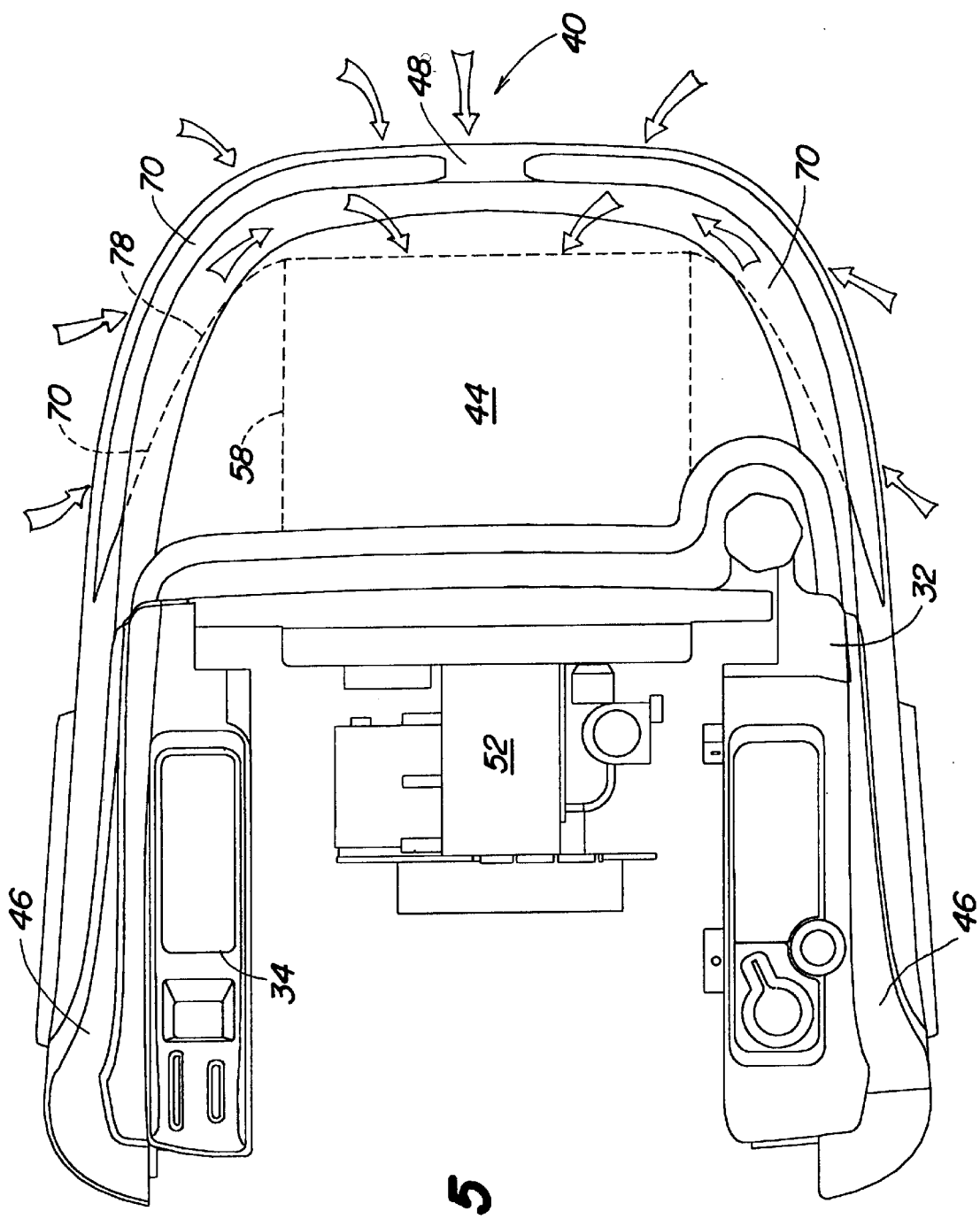
FIG. 5 is a partial plan view of the vehicle illustrating airflow through the grille and directed by the baffle of the hood.

A partial plan view of the vehicle illustrating airflow through the grille and directed by the baffle of the hood is illustrated in FIG. 5. Cooling air is drawn through the grille 58 from both sides 46 as well as through the rear surface 48 of the hood 40. During operation of the vehicle 10, air drawn by the fan 62 will enter the grille 50 and flow in streams along passages created by the baffle 70 and sidewalls 72 and air intake duct 60 as illustrated by the arrows shown in FIG. 5. The baffles 70 direct air drawn by the fan 62 to the rear of the vehicle 10, where the baffles 70 end and air is directed to an open area behind the radiator 58. While the major portion of air drawn by the fan 62 passes through the radiator 58, air may be diverted for other purposes, such as for combustion or for passage through an oil cooler (not shown) or other auxiliary heat exchanger. In the preferred embodiment the barrier provision 76 includes a combustion air orifice which is coupled to the air filter 56 by a engine air intake conduit 82.

Preferably, the hood 40 is formed as a unitary composite member as by a rotomolding process so that the baffles 70 are formed integrally therewith. The reduction in the number of parts represents a cost savings and simplifies assembly of the vehicle 10 process. Also, the number of joints which require sealing in the cooling system 54 in order to convey the cooling air are reduced.

The baffles 70 may further serve to contain noise generated by the engine and isolate it from the operator, as well as those who would be adjacent the operation of the vehicle. This is accomplished by the baffles 70 because they dampen certain engine noises before they emanate outside the hood 40.

When the vehicle 10 is in operation, the hood 40 will occupy the closed position illustrated in FIG. 1 and a latching mechanism carried between the hood 40 and the vehicle 10 would secure it in its closed position. When access to the engine 52, cooling system 54 and/or other components carried within the compartment is desired, the latching mechanism is released and the hood 40 may be manually shifted rearwardly as shown in FIG. 2, unsealing the gaskets 74 from the sealing surfaces of the hood 40. A handle 84 (shown in FIG. 4) is provided to ease sliding movement of the hood 40. Looking to FIGS. 6 & 7, a left rear elevated fragmentary perspective view of the vehicle 10 is shown illustrating various components of the vehicle cooling system 54. The radial fan 62 is coupled to a discharge face of the radiator 58 by the fan air intake duct 60. The fan shroud 64 preferably includes a forward opening 76 so that the fan 62 will draw engine heated air from the forward area of the enclosure where the engine 52 is situated, as well as cooling air through the radiator as described with reference to FIG. 5.

With the present invention there is provided a hood structure which encloses the major portion of the engine and cooling system of the vehicle. The hood includes screened openings forming a grille on more than one side of the hood that permit air to pass through to the cooling system and engine. With the composite material utilized to produce the hood, baffles are formed in registration with the screened air intake openings so that the grille may be extended over more than one of the surfaces of the hood or shroud while the air will be conveyed to a central area where the hood is sealed against a radiator. The air is thereby required to pass through the radiator for engine cooling or is diverted for use in another vehicle operation, such as combustion.

Although the invention is described with reference to an illustrative embodiment, it will be understood by those skilled in the art that the invention may be advantageous in the form described as modified for use in other applications. The present invention should not be limited by the above-described embodiments, but should be limited solely by the claims that follow.

What is claimed is:

1. A cooling system assembly for an off-road vehicle having an engine surrounded at least in part by an engine enclosure, said cooling system assembly comprising:

a heat exchanger coupled to the engine for cooling the engine, said heat exchanger having an air intake face and an air discharge face;

a radial fan positioned between the engine and the heat exchanger, said fan operably connected to the air discharge face of the heat exchanger for drawing air axially from around the engine as well as through the heat exchanger, and exhausting the air radially;

said engine enclosure including an end face lying substantially in a plane disposed substantially perpendicular to a longitudinal axis of the vehicle and first and second side faces, each of said first and second side faces lying substantially in a plane disposed substantially parallel to the longitudinal axis of the vehicle; and said enclosure having a screened air intake forming a grille located at least partially on the end face and each of the first and second side faces, an inner wall forming a baffle aligned with at least one of the faces, and sidewalls adjacent the air intake and the baffle for forming a substantially gastight passage therebetween for directing air from the air intake to the heat exchanger air intake face.

2. The cooling system assembly of claim 1 additionally comprising a sealing gasket around the periphery of the air intake face of the heat exchanger between it and the hood.

3. The cooling system assembly of claim 2 wherein the enclosure includes a sealing surface and the gasket is mounted about the periphery of the heat exchanger.

4. The cooling system assembly of claim 3 wherein the sealing surface cooperates with the gasket to form a substantially gastight seal so that a majority of air passing through the grille is directed to and through the heat exchanger.

5. The cooling system assembly of claim 4 wherein a portion of the air passing through the grille is directed to an engine air cleaner.

6. The cooling system assembly of claim 5 additionally comprising a barrier provision mounted to the top of the heat exchanger wherein the barrier provision includes a passage coupled to the air cleaner.

7. The cooling system assembly of claim 6 wherein the gasket is mounted to the barrier provision.

8. The cooling system of claim 1 wherein the end face of the enclosure is substantially vertical and forms a rear end of the vehicle.

9. The cooling system of claim 1 additionally comprising a fan shroud encompassing the fan, the fan shroud having a discharge port for exhausting heated air drawn by the fan.

10. The cooling system of claim 1 wherein the heat exchanger is positioned at an oblique angle with respect to the end face of the enclosure.

* * * * *